United States Patent [19]

Herrmann et al.

[11] Patent Number: 4,981,911
[45] Date of Patent: Jan. 1, 1991

[54] AB BLOCK COPOLYMERS BASED ON BUTADIENE, ISOPRENE AND STYRENE, PROCESS FOR THEIR PREPARATION AND THEIR USE

[75] Inventors: Christoph Herrmann, Marl; Walter Hellermann, Dorsten; Hans-Bernd Fuchs; Karl-Heinz Nordsiek, both of Marl; Juergen Wolpers, Haltern, all of Fed. Rep. of Germany

[73] Assignee: Huels Aktiengesellschaft, Marl, Fed. Rep. of Germany

[21] Appl. No.: 216,310

[22] Filed: Jul. 8, 1988

[30] Foreign Application Priority Data

Jul. 28, 1987 [DE] Fed. Rep. of Germany ....... 3724871

[51] Int. Cl.$^5$ ..................... C08F 279/02; C08F 293/00
[52] U.S. Cl. ...................................... 525/258; 525/259; 525/271; 525/374
[58] Field of Search ................ 525/258, 259, 271, 314

[56] References Cited

U.S. PATENT DOCUMENTS

| 3,830,880 | 8/1974 | La Mare ............................... 525/258 |
| 4,413,098 | 11/1983 | Hattori et al. ....................... 525/314 |
| 4,814,386 | 3/1989 | Hellermann et al. ............... 525/271 |

FOREIGN PATENT DOCUMENTS 0206423 11/1984 Japan .................................... 525/314

Primary Examiner—John C. Bleutge
Assistant Examiner—Vasu S. Jagannathan
Attorney, Agent, or Firm—Oblon, Spivak, McClelland, Maier & Neustadt

[57] ABSTRACT

An unsaturated elastomeric AB block copolymer, comprising:
  (i) 45–85 wt. % 1,3-butadiene,
  (ii) 5–40 wt. % isoprene, and
  (iii) up to 30 wt. % styrene,
wherein said AB block copolymer comprising:
  40–80 wt. % of a block A, said block A comprising butadiene monomer units and having a content of uniformly distributed vinyl groups of 8–60 wt. %, and
  60–20 wt. % of a block B, said block B comprising 0–60 wt. % 1,3-butadiene, at least 10 wt. % isoprene and up to 45 wt. % styrene monomer units, wherein the butadiene and isoprene monomer units have a vinyl group content of 75–90 wt. %.

6 Claims, 3 Drawing Sheets

AB BLOCK COPOLYMERS BASED ON BUTADIENE, ISOPRENE AND STYRENE, PROCESS FOR THEIR PREPARATION AND THEIR USE

BACKGROUND OF THE INVENTION

1. Field of the Invention

The present invention relates to unsaturated elastomeric AB block copolymers based on butadiene, isoprene and styrene, their manufacture and their use for the manufacture of tire treads.

2. Discussion of the Background

It is generally accepted that rubber polymers which are to be employed in tire making must satisfy the following requirements, i.e., cold creep must be as little as possible, the polymers must be readily processable in subsequent blending processes, the polymers must be flowable during the molding processes, and the polymers must be readilly vulcanizable.

In addition, special requirements have to be complied with which arise from their particular application in tire making. It is well known that in recent times increased demands are being made on the properties of tire treads:

(a) They are required to retain their elasticity even at low temperatures.
(b) They must exhibit good anti-skid properties in wet conditions.
(c) They are required to have high abrasion resistance to provide a correspondingly long service life.
(d) When subjected to dynamic loads they should generate as little heat as possible. Their rolling resistance is to be as low as possible in order to keep the fuel consumption of the vehicle as low as possible.

It is known that rubbers, when subjected to torsional vibration tests exhibit a temperature dependency of the logarithmic decrement of mechanical damping and derived therefrom a temperature dependency of the mechanical loss factor tan delta which when expressed as a graph, yields a graph configuration which is characteristic for the particular rubber. The desired requirements for tire treads are met in particular if the tan delta curve comprises as wide a rane of high vibration as possible (see K. H. Nordsiek. Kautschuk und Gummi, Kunstoffe 38, 178 (1985) and 39, 599 (1986).

It is also known that these partly contradictory properties of tire threads are determined to a substantial extent by the nature and composition of the rubbers employed for this purpose. Homopolymers based on the conventionally empolyed monomeric raw materials such as butadiene, isoprene and styrene do not meet these requirements satisfactorily (see EP-OS 0 054 204 and JP-OS 82/87 406).

Blends of different types of rubbers are in practice subject to the disadvantage that the above stated spectrum of properties is not attained and the desired tire technological qualities are not reproduced reliably. Accordingly, there exists a need for rubbers which substantially satisfy the aforesaid desired properties. In principle it should be possible to attain this object with rubbers composed of polymers comprising a variety of blocks.

For purposes of this invention, the meaning of blocks of a polymer is not restricted only to chain segments composed of different monomeric building elements, but also includes those segments which, dictated by the extraneous process parameters, exhibit abrupt variations in the nature of incorporation of the monomeric building elements or in the proportion in which they are incorporated in a chain segment.

Although the butadiene-isoprene copolymer described in EP-OS 0 054 204 comprises in its initial and terminal portion a different content of isoprene as a result of the lower tendency of isoprene to polymerize as compared with butadiene, it is not to be considered a block copolymer within the meaning just explained.

Also, if during the copolymerization of dienes and styrene the styrene proportion is changed (see DE-OS 31 08 583) no block copolymers are attained, but merely a gradual transition. The desired improvement of tire technological properties is still inadequate, even ln that case. Single phase rubber systems are described in DE-OS 31 08 583 comprising a damping maximum created by a glass transition point in a very narrow temperature range.

An improvement is attained only by virtue of a copolymer being produced comprising two different blocks A and B which differ in their structure and/or composition.

A statistical styrene-butadiene block copolymer is thus described for example in DE-OS 31 51 139. The blocks differ in their butadiene contents and their contents of vinyl bonds. They are so intermixed that they are rendered compatible and that instead of two separate damping maxima only a single such maximum is observed.

In DE-OS 35 30 438 rubber compositions are claimed which comprise at least 20% of a styrenebutadiene block copolymer. The blocks differ in respect of their styrene contents, their vinyl bond contents and, as a result thereof, in their glass transition temperatures. In that case as well, the tan delta curve exhibits only a narrow temperature range of maximum damping.

Japanese published specification 83/122 907 describes branched rubber polymers which may be obtained by the conversion e.g. of a metallic tetrahalogen compound, such as $SnCl_4$ with block copolymers comprising a polyisoprene and a polybutadiene block. Thus each of the two blocks is present as a homopolymer. The starshaped polymer which is attained after conversion with the metallic coupling agent forms a single phase system having one narrow glass transition point.

GB-PS 2 090 840 describes block copolymers which are attained by the polymerization of dienes or the copolymerization of diene mixtures and the blocks of which differ in respect of their contents of 1,2 and/or 3,4 structural units by 20 to 50 mol %. The preparation of such block copolymers takes place in the presence of different amounts of co-catalyst or at different temperatures.

Tire treads are described in EP-OS 0 173 791, the rubber component of which may be composed to 30 to 100% of block copolymers based on butadiene, isoprene and optionally styrene and/or piperylene. The block copolymers are produced in the presence of cocatalysts by increasing the temperature and may, for example, comprise an AB structure. The polymers always contain a terminal butadiene block which is formed at rising temperature and which accordingly comprises a comparatively high content of 1,2 structural units and an uneven distribution of the vinyl groups. Even those block copolymers do not yield tan delta curves having an adequately wide plateau in order to comply optimally with all required tire properties (see comparative example A). Accordingly, even that specification proposes to blend the block copolymers so obtained with other rubber components (see Claim 1 and Example 2).

All aforementioned block copolymers are subject to at least one of the following shortcomings:
1. The block copolymers do not satisfy adequately the abovementioned requirements with a view to their use as tire materials.
2. Compatibility problems of the two blocks are experienced.
3. The tan delta curve exhibits only a narrow damping maximum.
4. Large amounts of comparatively expensive isoprene are required.

SUMMARY OF THE INVENTION

Accordingly, one object of the present invention is to develop AB block copolymers based on isoprene, butadiene and styrene which provide a tan delta curve of a vibration damping region so broad that an admixture of further rubber components for broadening the vibration damping range is no longer required. Preferably this vibration damping region is to be between −90° C. and +30° C.

Surprisingly AB block copolymers have now been found, based on 45 to 85 wt.% butadiene, 5 to 40 wt.% isoprene and up to 30 wt.% styrene. These comprise:
(i) 40 to 80 wt.% of a block A containing butadiene units with a content of uniformly distributed vinyl groups of 8 to 60%, and
(ii) 60 to 20 wt.% of a block B which contains 0–60 wt.% 1,3-butadiene, at least 10 wt.% isoprene and up to 45 wt.% styrene, the diene units (1,3-butadiene and isoprene) having a vinyl content of 75 to 90%.

Preferably the AB block copolymer contains 50 to 75 wt.% 1,3-butadiene, 10 to 35 wt.% isoprene and 5 to 25 wt.% styrene.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
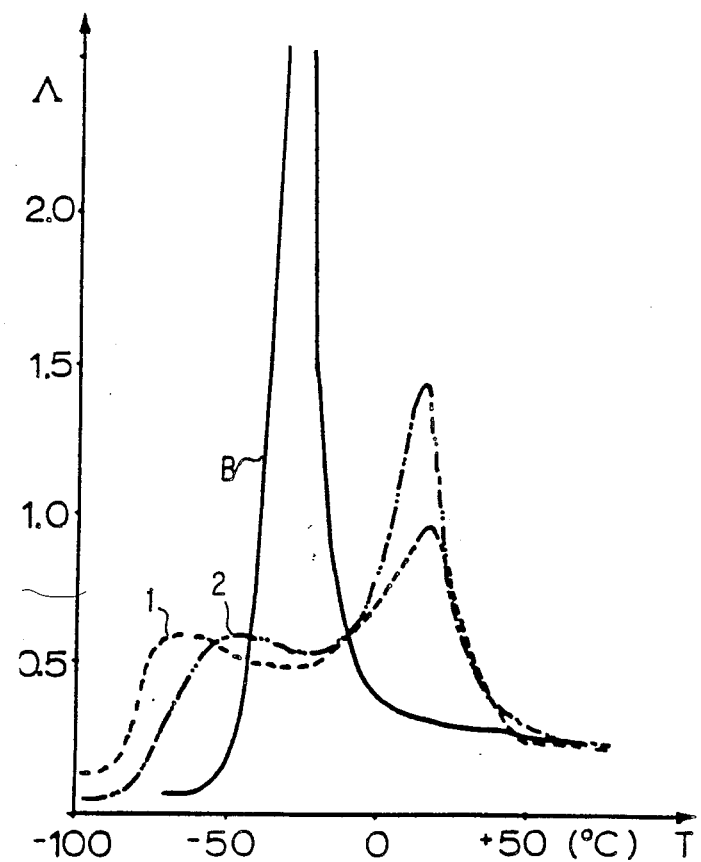
FIG. 1 is a set of torsion pendulum diagrams according to Schmieder-Wolf of vulcanized test specimens produced in analogy to the instructions for SBR in ISO 2322-1985 (E) Series A) using the AB block copolymerization products of Examples 1 and 2 as well as of Comparative Example B. It can be seen clearly that the torsiograms of the Examples 1 and 2 according to the invention are wider than the torsiograms according to Comparative Example B.
Figure 2:
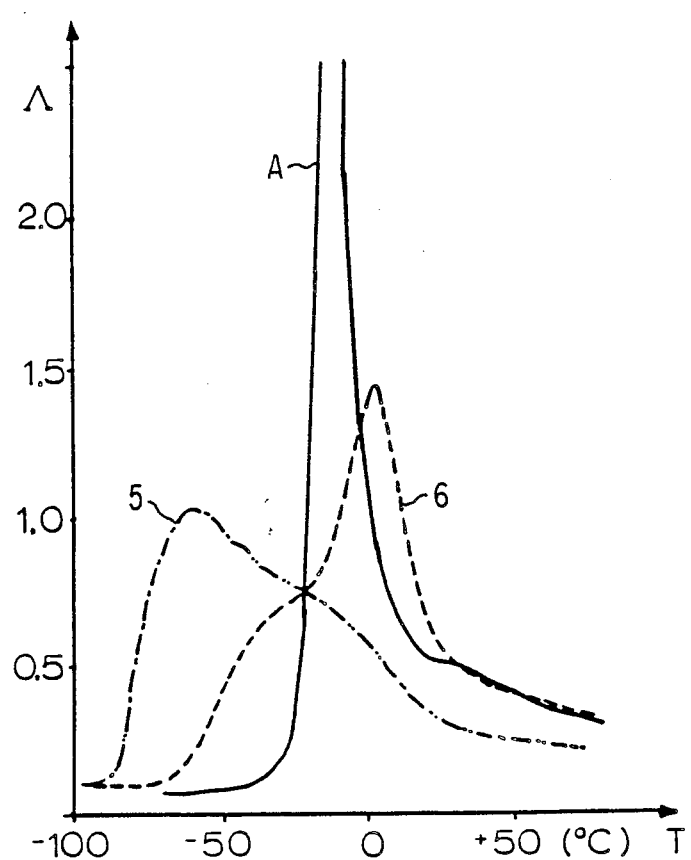
FIGS. 2 and 3 are torsiograms of Examples 5, 6 and A, respectively 8, 9 and 10.
Figure 3:
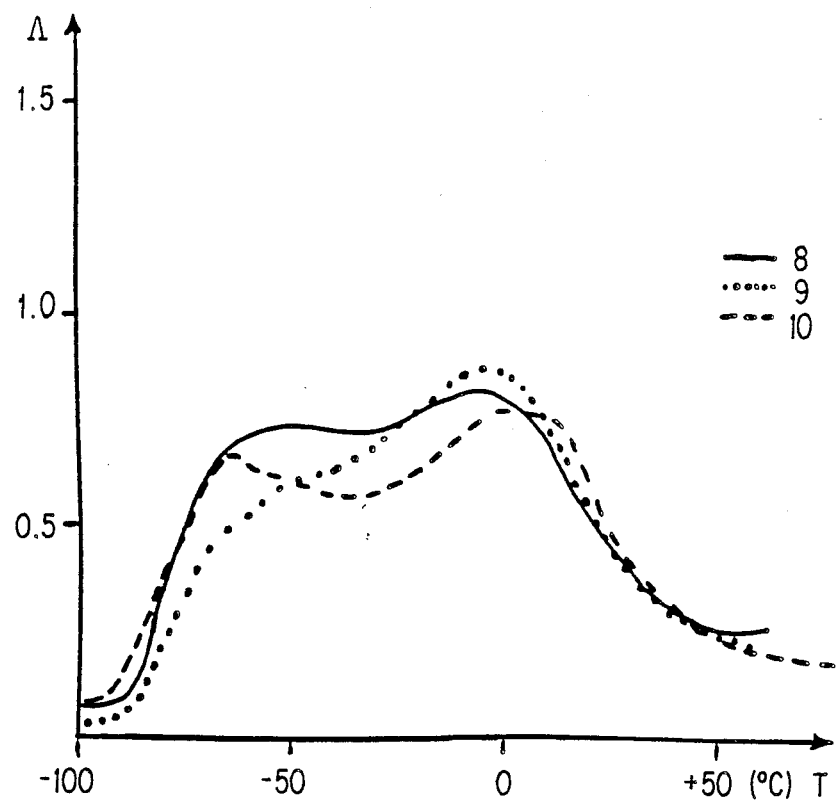

The AB block copolymers of the present invention are prepared by polymerizing 1,3-butadiene, isoprene and styrene. The overall monomer composition of the AB block copolymer is 45-85 wt.% 1,3-butadiene, 5-40 wt.% isoprene and up to 30 wt.% styrene.

Isoprene may be polymerized in a 1,2- (3,4-) or 1,4-polymerization process butadiene may be polymerized in a 2 or 1,4-polymerization process. When the diene monomers are 1,2-polymerized, a 1,2-diene monomer unit having a pendant vinyl group will result. A pendant isopropeny group results from 3,4-polymerization of isoprene monomers. When the diene monomers are 1,4-polymerized, there will be no pendant vinyl groups produced. Rather, in 1,4-polymerization processes, a 1,4-diene monomer unit is produced in which the carbon-carbon double bond is present between C2 and C3 of the diene monomer unit. Accordingly, the 1,4-polymerization of isoprene will give rise to a 1,4-isoprene monomer unit. Similarly, the 1,4-polymerization of 1,3-butadiene will result in a 1,4-butadiene monomer unit. Both 1,2-polymerzation monomer units and 1,4-polymerization monomer units may be present in each of block A and block B of the present block copolymers.

Block A is described in more detail in the following. The vinyl groups may be distributed either statistically or with an increasing or decreasing gradient along the chain. The proportion of vinyl groups preferably amounts to 10 to 50%. Up to 25% of the butadiene units of block A are replaceable by styrene units. Up to 30% of the butadiene units of block A may be replaced by isoprene units having a content of at least 60% 1,4-isoprene monomer units.

Block B consists preferably of 10 to 60 wt.% butadiene, 10 to 70 wt.% isoprene and 5 to 45 wt.% styrene.

The AB block copolymers may be linear or may be branched. Such branching can be attained by means of a branching agent during the polymerization or by means of a coupling agent towards the end of the polymerization.

The process for the manufacture of the block copolymers by anionic polymerization of the monomers in an inert organic solvent in the presence of an organolithium compound is characterized in that initially a block A is produced by polymerization of 1,3-butadiene, optionally in the presence of a small amount of a cocatalyst. It is also possible to replace up to 25% of the butadiene by styrene and up to 30% of the butadiene by isoprene during the production of block A. Thereafter a block B is produced in that a mixture of butadiene, isoprene and styrene is polymerized in the presence of a co-catalyst.

In principle it is possible to introduce into the reaction vessel at the commencement of the polymerization of block A, the amounts of monomers which are required for the preparation of block A. However, it is also possible to introduce even at the commencement of the polymerization of block A the total amount of butadiene and optionally styrene and to commence the preparation of block B by the addition of the further components.

The invention also relates to the use of the AB block copolymers for the manufacture of tire treads.

In the following, the process is to be described in detail. An inert organic solvent is employed as the reaction medium. Hydrocarbons having 6 to 12 carbon atoms such as pentane, hexane, heptane, octane and decane and their cyclic analogues are particularly suitable. Aromatic solvents, e.g. benzene, toluene, xylene and others are also suitable. It stands to reason that mixtures of the aforementioned solvents may also be employed.

Alkyl lithium catalyst compounds which can readily be obtained by the reaction of lithium with the corresponding monofunctional alkylhalides are employed as catalysts. The alkyl moieties comprise 1 to 10 carbon atoms. Individual hydrogen atoms may be substituted by phenyl moieties. The following monofunctional organolithium lithium compounds are particularly suitable: methyllithium, ethyllithium, pentyllithium, n-butyllithium being particularly preferred.

In order to improve the cold creep properties, at least one polymerization stage is preferably carried out in the presence of small amounts of a branching agent, e.g. divinylbenzene (DVB). Not more than 0.5 parts DVB based per 100 parts monomer are employed. Such addition is dispensed with if after the polymerization a coupling reaction is provided for.

The nature and amount of catalyst and branching agent are generally so selected that the block copolymer obtained has the following properties:

(a) Mooney viscosity (ML1-4 100° C. DIN 53 523): 35 to 120;

(b) Non-uniformity U = (Mw/Mn) - 1, determined by gel permeation chromatographic analysis (GPC analysis): 0.6 to 3.0;

(c) Defo elasticity (80° C., DIN 53 514): 20.

In the present process block B is prepared in the presence of a cocatalyst.

In this case the object is to obtain polymers having the highest possible content of 1,2 and/or 3,4 (see below) structural units.

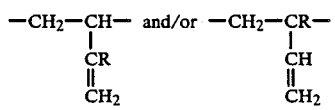

R=H (butadiene) R=CH3 (isoprene)

Thus the cocatalysts are selected in accordance with their ability to control the microstructure, i.e. the manner in which the polymerization proceeds in respect of directing it towards as complete as possible a formation of 1,2 and/or 3,4 structural units.

The cocatalyst is generally selected from the group of ethers, tertiary amines or tertiary amines containing ether groups. Mixtures of different cocatalysts may also be employed.

Suitable ethers comprise, in particular, dialkyl ethers of ethyleneglycol and diethylene glycol, their alkyl groups each comprising up to 4 carbon atoms, such as ethyleneglycol diethyl ether (DEE).

Ethers of the general formula

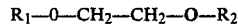

are particularly preferred in for the manufacture of branched block copolymers, $R_1$ and $R_2$ representing alkyl moieties having different numbers of carbon atoms selected from the group of methyl, ethyl, n- and isopropyl as well as n-, iso-, sec.- and tert. butyl. Preferably the sum of the carbon atoms of the two moieties $R_1$ and $R_2$ is from 5 to 7, more particularly 6. A particularly suitable ethyleneglycol ether is the compound wherein $R_1$ is ethyl and $R_2$ is tert. butyl. The glycol ethers are, for example, obtainable in accordance with the principles of the Williamson synthesis from a sodium alcoholate and an alkyl halogenide. The ethers of the formula

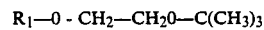

may be produced in a simple manner by converting the corresponding alcohol

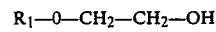

with isobutene in the presence of an acidic ion exchanger.

Suitable tertiary amines are for example N,N,N',N'-tetramethylethylene diamine, N,N,N',N'-tetraethylethylene diamine and triethylene diamine.

Suitable amines containing ether groups are N-methylmorpholine and N-ethylmorpholine.

The cocatalyst is employed in a ratio of 2:1 to 50:1, in particular 2:1 to 30:1 per mole of the catalyst. At higher temperatures larger quantities of cocatalyst are generally required in order to attain the desired microstructure control. Reaction temperatures of 100° C. should not be exceeded. It is possible, also, to operate at rising or falling temperatures; in that case, however, care must be taken that the microstructure does not suffer fundamental change.

In the production of the block B and, where applicable, block A, styrene may be added as a comonomer. Care must be taken by suitable expedients to ensure that the content of polystyrene blocks in the AB block copolymer does not exceed 2% by weight. A process for determining the content of polystyrene blocks is described in the textbook Houben-Weyl "Methoden der Organischen Chemie", Vol. 14/1 (1961), page 698.

It is known that certain compounds proposed as cocatalysts have the property of suppressing the formation of polystyrene blocks. The same property is present in compounds which are known as randomisers and which are usually potassium salts of alcoholates as well as organic carboxylic and sulphonic acids.

In accordance with a particular embodiment of the process, the "living polymers", present at the end of the polymerization can be converted into branched or star-shaped block copolymers with a coupling agent.

Suitable coupling agents are polyepoxides such as epoxidized linseed oil, polyisocyanates, polyketones such as 1,3,6-hexanetrione, polyanhydrides, for example the dianhydride of pyromellitic acid and dicarboxylic acid esters such as adipic acid dimethylester. Particularly suitable are (a) the tetrahalides of the elements Si, Ge, Sn and Pb, in particular SiCl4, (b) organic compounds of the general formula $R_n[SiX_3]_n$, wherein X is a halogen, n=1 to 6, in particular n=1 and 2. In this context R is an organic moiety having a valency of n, for example an aliphatic, cycloaliphatic or aromatic moiety having 6–16 carbon atoms. 1,2,4-Tris(2-trichlorosilylethyl)-cyclohexane, 1,8- bis(trichlorosilyl)-octane and 1-(trichlorosilyl)octane serve as examples.

(c) Organic compounds which contain at least once the moiety $SiX_2$, e.g. dimethylsilylchloride.

(d) Halogen hydrosilanes of the general formula $Si(H)_m(X)_{4-m}$ wherein m is from 3 to 1, and (e) Di- and trivinylbenzenes, e.g. 1,4-divinylbenzene.

It was found to be particularly advantageous to use divinylbenzene as a coupling agent.

The process may be conducted discontinuously as well as continuously.

The person skilled in the art will be able by means of the temperature dependency of the logarithmic decrement of the mechanical damping or the tan delta curve to produce, by varying the reaction conditions, block copolymers which can be processed into tire treads having the desired combinations of properties.

The amorphous polymers obtained will be mixed with active reinforcing fillers, a vulcanizing agent and conventional additives if they are to be converted into vulcanization products. Generally speaking, it is necessary to carry out such mixing in the presence of shear force effects.

Compositions which are intended for the manufacture of tire treads are generally formed as camelbacks. During the homogenization and molding which may for example take place in an extruder, the conditions of temperature and time are so selected that no vulcanization takes place.

The rubber component in the vulcanizable compositions may for example comprise more than 70 and in particular 100 wt.% of a block copolymer according to the invention and 0 to 30 wt.% of a known amorphous general purpose rubber, e.9. styrene butadiene rubber cis-1,4-polybutadiene, cis-1,4-polyisoprene and natural rubber. If desired the content of general purpose rubber may even be raised substantially higher.

Active, reinforcing fillers are for example tire tread carbon blacks of various activities, optionally treated with silane bonding agents, highly dispersed silicic acids and mixtures thereof.

Conventional vulcanizing agents contain, e.g. sulphur in combination with accelerators. The amount of vulcanizing agents depends on the remaining components in the vulcanizable composition and can be determined by simple preliminary tests.

Plasticizer oils as conventionally used in caoutchouc technology, preferably aromatic, aliphatic and naphthenic hydrocarbons and conventional auxiliaries, for example zinc oxide, stearic acid, rosin acids, ageing protective agents and ozone protective waxes may serve as additives, added in conventional quantities.

The block copolymers according to the invention, are suitable for the manufacture of tire treads for automobile tires and truck tires, not only for the manufacture of new tires, but also for the retreading of old tires.

The tire treads are characterized in particular be the following advantageous properties:
high skid resistance under wet conditions
high abrasion resistance
low rolling resistance and thus low fuel consumption
high wear resistance
all-weather suitability.

Other features of the invention will become apparent in the course of the following descriptions of the exemplary embodiments which are given for illustration of the invention and are not intended to be limiting thereof.

EXAMPLES

A hydrocarbon mixture was employed as the solvent, comprising about 50% hexane. Additional components of this hydrogenated $C_6$ fraction were in particular pentane, heptane and their isomers. The solvent was dried over a molecular sieve of pore size 0.4 nm, such that the water content was lowered below 10 ppm, followed by $N_2$ stripping.

The organic lithium compound was n-butyllithium which, unless stated otherwise, was employed in the form of a 20 wt.% solution in hexane.

The monomers isoprene and styrene were boiled under reflux over calcium hydride for 24 hours prior to use, distilled off and titrated to the end point with n-butyllithium in the presence of o-phenanthroline.

The glycol ethers were distilled over calcium hydride and subsequently titrated to the end point with n-butyl-lithium in the presence of o-phenanthroline.

The divinylbenzene (DVB) was present as a mixture of m- and p-divinylbenzene and was employed in the form of a 64% solution in hexane. The extent of conversion was determined by determining the solids content after evaporating off the solvent and the monomers.

The temperature dependence of the logarithmic decrement of mechanical damping were determined with a torsion pendulum according to Schmieder Wolf as set out in DIN 53 520. The microstructure was determined by I.R. spectroscopy.

The coupling yield is considered to be the percentage of caoutchouc which after the conversion with a coupling agent comprises a star-shaped structure and is characterized as compared with the non-coupled rubber by a considerably higher molecular weight. This is determined by GPC analysis, tetrahydrofuran being used as solvent and polystyrene as the column material. The polymers are characterized by means of a light scattering detector. For that purpose samples are taken from the reactor prior to the addition of the coupling agent and also towards the end of the reaction. The Defo hardness (DH) and the Defo elasticity (DE) were determined by conventional measuring methods (DIN 53 514).

Parts are given in terms of parts by weight, percentages (%) are expressed in terms of weight %.

EXAMPLE 1

275 parts hexane, 65 parts 1,3-butadiene and 0.03 parts DVB were initially introduced into a first V2A stainless steel stirred autoclave, rinsed with nitrogen and, after drying over a molecular sieve (0.4 nm), titrated with n-butyllithium (BuLi) with thermoelectric control. The polymerization was started at 50° C. by the addition of 0.051 parts n-butyl lithium. In spite of cooling the temperature rose briefly to a maximum of 62° C.. After 107 minutes, after the preintroduced 1,3-butadiene had been used up almost completely, an IR sample was taken and processed in the same manner as the final product. Immediately thereafter, within 85 seconds, the contents of a second V2A autoclave (40° C.) were added. The latter contained a solution, titrated with n-butyl lithium, of 5 parts 1,3-butadiene, 15 parts isoprene and 15 parts styrene in 190 parts hexane.

Immediately thereafter 1.0 parts ethylene glycol dimethyl ether were added. The temperature was kept constant at 50° C. 4 hours after the start, the polymerization was stopped by the addition of a solution of 0.5 parts 2,2'-methylene-bis-(4)methyl-6-tertiary butyl phenol in two parts wet toluene. The solvent was distilled off with steam and the polymerization product dried for 24 hours at 70° C. in a circulatory drying cabinet.

EXAMPLES 2 TO 7, Comparative Examples A and B

All reaction conditions which do not correspond to those of Example 1 are listed in Tables 1 and 2.

Comparative Example C

BUNA ® EM 1712 is a conventional styrene-butadiene rubber, extended with 37.5 parts oil, manufactured by Bunawerke H0Is GmbH. Departing from the general vulcanization mixture as staled further below the BUNA ® EM 1712 was vulcanized in the following composition:
137.5 parts BUNA ® EM 1712
75 parts carbon black N 339
3 parts aromatic oil
3 parts zinc oxide
2 parts stearic acid
1 part VULCANOX ® 4010 NA 1 part VULCANOX® 4020
1 part KORESIN®
1.5 parts CBS
0.2 parts DPG
2 parts sulfur The composition of the vulcanizing auxiliary agent was as given further below.

TABLE 1

|  | Example 2 | Example 3 | Example 4 | Example 5 |
|---|---|---|---|---|
| Pre-introduced |  |  |  |  |
| Parts hexane | 275 | 275 | 235 | 345 |
| Parts butadiene | 65 | 60 | 40 | 70 |
| Parts co-catalyst | 0.025** | 0.075* | — | — |
| Parts DVB | 0.03 | 0.03 | 0.02 | 0.03 |
| Start with parts BuLi | 0.055 | 0.051 | 0.046 | 0.052 |
| Start with block B after x minutes | 120 | 120 | 120 | 120 |
| By addition of |  |  |  |  |
| parts butadiene | 10 | 13 | 19 | 10 |
| parts isoprene | 15 | 16 | 24 | 15 |
| parts styrene | 10 | 11 | 17 | 5 |
| parts hexane | 190 | 190 | 250 | 125 |
| parts DEE | 0.75 | 1.0* | 0.75 | 1.0 |
| End of the polymerization after y hours | 4 | 4 | 4 | 4 |

*ethyleneglycol ethyl tertiary butyl ether
**DEE

TABLE 2

|  | Example 6 | Example 7 | Comparative Example A | Comparative Example B |
|---|---|---|---|---|
| Pre-introduced |  |  |  |  |
| Parts hexane | 280 | 275 | 275 | 450 |
| Parts butadiene | 60 | 60 | 80 | 100 |
| Parts co-catalyst | 0.025* | — | 0.015** | 0.075*** |
| Parts DVB | 0.03 | 0.03 | 0.03 | — |
| Start with parts BuLi | 0.056 | 0.050 | 0.062 | 0.031 |
| Start with block B after x minutes | 100 | 120 | 15 | 13 |
| By addition of |  |  |  |  |
| parts butadiene | 7 | 13 | — | — |
| parts isoprene | 22 | 16 | — | — |
| parts styrene | 11 | 11 | 20 | — |
| parts hexane | 190 | 190 | 190 | — |
| parts DEE | 0.5* | 0.75 | 0.5** | 0.75 |
| End of the polymerization after y hours | 3 | 4 | 1 | 2 |

*DME
**Diglyme
***DEE

The Comparative Example A corresponds to DE-OS 35 30 438.
The Comparative Example B corresponds to GB-PS 2 090 840.

TABLE 3

Percentage proportion of structural elements obtained by polymerization of the following monomers

|  | Butadiene | | | Isoprene | | |
|---|---|---|---|---|---|---|
|  | 1,4-trans | 1,2[(1)] | 1,4-cis | 3,4- | 1,4- | Styrene |
| Example 1 | 34 | 13 | 24 | 10 | 3 | 16 |
| Example 2[(2)] | 28 | 28 | 20 | 11 | 2 | 11 |
| Example 3 | 21 | 38 | 14 | 11 | 3 | 13 |
| Example 4 | 24 | 19 | 18 | 18 | 2 | 19 |
| Example 5 | 37 | 16 | 29 | 13 | 1 | 6 |
| Example 6 | 23 | 29 | 17 | 18 | <1 | 13 |
| Example 7[(2)] | 31 | 18 | 23 | 13 | 2 | 13 |
| Example A | 21 | 43 | 15 | 0 | 0 | 21 |
| Example B | 23 | 65 | 12 | — | — | — |

[(1)]Including 1,2-isoprene
[(2)]The content of polystyrene blocks amounts to 0.3%, based on the AB-block copolymerization product.

TABLE 4

Composition of AB block copolymerization products

|  | Block A | | Block B | | |
|---|---|---|---|---|---|
| Example | Butadiene units (%) | 1,2-Butadiene units (%) | Butadiene (%) | Isoprene (%) | Styrene (%) |
| 1 | 65 | 12 | 5 | 15 | 15 |
| 2 | 65 | 30 | 10 | 15 | 10 |
| 3 | 60 | 46 | 13 | 16 | 11 |
| 4 | 40 | 14 | 19 | 24 | 17 |
| 5 | 70 | 11 | 10 | 15 | 5 |
| 6 | 60 | 39 | 7 | 22 | 11 |
| 7 | 60 | 12 | 13 | 16 | 11 |
| A | 30 | 31 | 50 | 0 | 20 |
| B | 50 | 47 | 50 | — | — |

TABLE 5

Characterization of the AB block copolymerization products

| Example | Mooney Viscosity | $D_H/D_E$ | Non-uniformity U |
|---|---|---|---|
| 1 | 88 | 1850/43 | 1.45 |
| 2 | 69 | 1175/35 | 1.27 |
| 3 | 41 | 625/27 | 1.04 |
| 4 | 69 | 1000/30 | 1.12 |
| 5 | 64 | not determined | 1.3 |
| 6 | 48 | 700/30 | 0.83 |
| 7 | 70 | 1000/30 | 1.12 |
| A | 42 | not determined | not determined |
| B | 51 | not determined | not determined |

From the AB block copolymerization products according to the invention, vulcanization mixtures were produced having the following composition and were subjected to detailed tests:

100 Parts AB block copolymerization product
50 Parts carbon black N 339
8 Parts highly aromatic oil
3 Parts zinc oxide
1 Part stearic acid
1 Part-N-isopropyl-N'-phenyl-p-phenylendiamine (VULCANOX® 4010 NA)
1 Part N-(1,3-dimethyl butyl)-N'-phenyl-p-phenylenediamine VULCANOX® 4020)
2 Parts KORESIN® reaction product of p-tertbutyl-phenol with acetylene
0.6 Parts N-cyclohexyl-1-benzothiazol sulphene amide (CBS, VULKAZIT® CZ)
0.3 Parts diphenyl guanidine (DPG, VULKAZITe DZ)
0.6 Parts N,N'-dimorpholyl disulphide (SULFASAN® R)
1.7 Parts sulfur The products VULCANOX® 4010 NA, VULKANOX® 4020, VULKAZIT® CZ and VULKAZIT® DZ are available from Bayer AG, Leverkusen, SULFASAN® R from Monsanto and KORESIN® from BASF AG, Ludwigshafen.

The physical data obtained are apparent from the following table.

TABLE 6

| Properties | Example 1 | Example 2 | Example 3 | Example 5 | Comparative Example C |
|---|---|---|---|---|---|
| ML[(10)] crude | 95 | 79 | 57 | 71 |  |
| ML[(10)] compound | 99 |  |  | 93 | 57 |
| $t_{10}$[(11)] min. | 9.4 | 9.4 | 10.0 | 9.8 |  |
| $t_{90}$[(11)] min. | 14.9 | 15.2 | 18.8 | 13.2 |  |
| Tensile strength | 19.5 | 13.0 | 16.5 | 17.0 | 18.5 |

TABLE 6-continued

| Properties | Example 1 | Example 2 | Example 3 | Example 5 | Comparative Example C |
|---|---|---|---|---|---|
| in MPa[1] | | | | | |
| Elongation at rupture in %[2] | 88 | 331 | 437 | 397 | 480 |
| Tensile value[1] in MPa at 100% elongation | 3.4 | 2.3 | 2.1 | 2.4 | 1.8 |
| Tensile value[1] in MPa at 300% elongation | 14.5 | 11.0 | 10.8 | 11.6 | 9.2 |
| Hardness[3] (Shore A) at 22° | 70 | 68 | 68 | 67 | 64 |
| Recoil elasticity[4] in % at 22° | 21 | 16 | 14 | 41 | 29 |
| in % at 75° | 56 | 56 | 55 | 61 | 45 |
| Abrasion[5] in mm³ | 100 | 98 | 150 | 70 | 140 |
| Continued tear resistance[6] | | | | | |
| at 22° C. in MPa | | 16.7 | 13.8 | | 10.5 |
| at 140° in MPa | | 4.9 | 5.4 | | 8.5 |
| Frank-Flexometer[7] | | 116 | 124 | | 109 |
| Ball shattering acc. to Marten[8] | | | | | |
| 150 N | 88 | 87 | 96 | 78 | 103 |
| 200 N | 14 | 115 | 123 | 96 | 135 |
| 250 N | 36 | 136 | 153 | 125 | 176 |
| 300 N | 60 | 163 | 12' | 154 | 10 |
| 350 N | 9' | 3' | | 210 | |
| 400 N | | | | 9' | |
| Braking distance asphalt/concrete at 50 km/h[12] | | 100/100 | 105/100 | | 100/100 |
| Resistance to rolling[9] | | | | | |
| at 50 km/h | | 106 | 106 | | 100 |
| at 80 km/h | | 105 | 109 | | 100 |
| at 100 km/h | | 108 | | | 100 |

Notes regarding to Table 6:
[1]According to DIN 53 504
[2]According to DIN 53 504
[3]According to DIN 53 505
[4]According to DIN 53 512
[5]According to DIN 53 516
[6]According to DIN 53 507
[7]According to DIN 53 533 Part 2
[8]According to S. Bostrom, Kautschuk-Handbuch volumn 5, Berliner Union, Stuttgart, pge 149, 150
[9]Measured on drum test rack. The data relate to Comparative Example C.
[10]Mooney viscosity (ML$_{1+4}$, 100° C., DIN 53 523)
[11]Vulcametry according to DIN 53 529
[12]The data relate to Comparative Example C.

EXAMPLE 8

625 parts hexane and 70 parts 1,3-butadiene were placed into a V2A stainless steel stirred autoclave rinsed with dry nitrogen. This was followed by heating to 50° C. and by titration with a 5% solution of n-butyl lithium in hexane with thermoelectric control. The polymerization was started at 50° C. by the addition of 0.071 parts n-butyl lithium. The temperature was kept constant by cooling. After 85% of the butadiene starting material had been converted 15 parts isoprene, 15 parts styrene and 1.1 parts 1-ethoxy-2-tert-butoxy ethane were metered in at 50° C. After 80 minutes a sample was withdrawn for the GPC analysis.

Thereafter 0.72 parts DVB were added at 50° C. After one hour at 50° C. the product was cooled to room temperature and 0.5 parts 2,2'-methylene-bis-(4-methyl6-tert-butylphenol) were added. The rubber polymer thereby obtained was precipitated with a mixture of isopropanol and methanol in a ratio of 80 : 20 by volume and dried for 24 hours at 70° in a circulatory drying cabinet.

EXAMPLE 9

The experimental procedure corresponds to Example 8 except that in this case 2.17 parts DVB are added instead of the previous 0.72 parts.

EXAMPLE 10

625 parts hexane and 70 parts 1,3-butadiene were pre-introduced into a V2A stainless stirred autoclave rinsed with dry nitrogen. This was followed by heating to 50° C. and by titration with a 5% solution of n-butyl lithium in hexane with thermoelectric control. The polymerization was started at 50° C. by the addition of 0.062 parts n-butyl lithium. The temperature was kept constant by cooling. After 92% of the butadiene feed had been converted, 15 parts isoprene, 15 parts styrene and 1.1 parts 1-ethoxy-2-tert-butoxy ethane were metered in at 50° C. After 80 minutes a sample was withdrawn for the GPC analysis.

Thereafter 0.054 parts 1,2,4-tris-(2-trichlorosilylethyl)cyclohexane were added at 50° C. After one hour at 50° C. the product was cooled to room temperature and 0.5 parts 2,2'methylene-bis-(4-methyl-6-tert-butylpheno;) were added. The rubber polymer so obtained was precipitated with a mixture of isopropanol and methanol in a ratio of 80 : 20 by volume and dried for 24 hours at 70° C. in a circulatory drying cabinet.

TABLE 7

Percentage proportions of structural elements obtained by the polymerization of the following monomers.

| | Butadiene | | Isoprene | | | Styrene |
|---|---|---|---|---|---|---|
| | 1,4-trans. | 1,4-cis | 1,2- | 3,4- | 1,4- | |
| Example 8 | 34 | 24 | 11 | 3 | 12 | 16 |
| Example 9 | 34 | 23 | 11 | 4 | 12 | 16 |
| Example 10 | 35 | 26 | 9 | 4 | 10 | 16 |

TABLE 8

Composition of the AB block copolymerization products

| | Block A | | Block B | | |
|---|---|---|---|---|---|
| Example | butadiene units (%) | 1,2-butadiene units* (%) | butadiene (%) | isoprene (%) | styrene (%) |
| 8 | 60 | 10 | 10 | 15 | 15 |
| 9 | 60 | 10 | 10 | 15 | 15 |
| 10 | 65 | 10 | 5 | 15 | 15 |

*Proportion of 1,2- units in Block A measured by IR-spectroscopy

TABLE 9

Characterization of the AB block copolymerization products

| | Mooney | | | Macrostructure | |
|---|---|---|---|---|---|
| Example | Viscosity | $D_H/D_E$ | U | Z[1] | K %[2] |
| 8 | — | — | 2.4 | 7 | 80 |
| 9 | — | — | 2.6 | 10 | 75 |

TABLE 9-continued

| | Mooney | | | Macrostructure | |
|---|---|---|---|---|---|
| Example | Viscosity | $D_H/D_E$ | U | $Z^{(1)}$ | $K \%^{(2)}$ |
| 10 | — | — | 1.3 | 7.5 | 80 |

Characterization of the AB block copolymerization products $^{(1)}Z$ = numerity, number of arms
$^{(2)}K$ = coupling yield Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters Pat. of the U.S. is:

1. An unsaturated elastomeric AB block copolymer, comprising:
    (i) 45–85 wt.% 1,3-butadiene,
    (ii) 5–40wt.% isoprene, and
    (iii) 1 to 30 wt.% styrene,
    wherein said AB lock copolymer comprises
    40–80 wt.% of a block A, said block A comprising 1,2-(3,4)- and 1,4-butadiene monomer units and having a content of uniformly distributed vinyl groups of 8–60 wt.%, and
    60–120 wt.% of a block B containing 1,3-butadiene isoprene and styrene monomer units, said block B comprising 10–60 wt.% 1,3-butadiene, at least 10 wt.% isoprene and 5 to 45 wt.% styrene monomer units, wherein the butaident and isoprene monomer units have a vinyl group content of 75–90 wt.%.

2. The copolymer of claim 1, wherein up to 25 wt.% of the 1,4-butadiene monomer units of block A are replaced by styrene.

3. The copolymer of claim 1, wherein up to 30% of the 1,4-butadiene monomer units of block A are replaced by isoprene monomer units, said isoprene monomer units comprising at least 60% 1,4-isoprene monomer units.

4. The copolymer of claim 2, wherein said copolymer comprises 50–75 wt.% 1,3-butadiene, 10–35 wt.% isoprene and 5–25 % styrene.

5. The copolymer of claim 1, wherein the content of vinyl groups in block A is 10–50%.

6. The copolymer of claim 1, wherein said copolymer has been subjected to branching by means of branching or coupling agents.

* * * * *